US 8,311,281 B2

(12) United States Patent
Ikeda

(10) Patent No.: US 8,311,281 B2
(45) Date of Patent: Nov. 13, 2012

(54) OBJECT DETECTION APPARATUS

(75) Inventor: Hiroo Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 179 days.

(21) Appl. No.: 12/922,053

(22) PCT Filed: Apr. 6, 2009

(86) PCT No.: PCT/JP2009/001584
§ 371 (c)(1),
(2), (4) Date: Sep. 10, 2010

(87) PCT Pub. No.: WO2009/125569
PCT Pub. Date: Oct. 15, 2009

(65) Prior Publication Data
US 2011/0026812 A1    Feb. 3, 2011

(30) Foreign Application Priority Data
Apr. 9, 2008    (JP) ................................. 2008-101097

(51) Int. Cl.
G06K 9/00    (2006.01)
(52) U.S. Cl. .......................... 382/103; 382/190; 348/135
(58) Field of Classification Search ........................ None
See application file for complete search history.

(56) References Cited

U.S. PATENT DOCUMENTS

| | | | | |
|---|---|---|---|---|
| 5,063,603 A | * | 11/1991 | Burt | 382/115 |
| 5,319,547 A | * | 6/1994 | Krug et al. | 705/13 |
| 5,438,630 A | * | 8/1995 | Chen et al. | 382/159 |
| 6,424,370 B1 | * | 7/2002 | Courtney | 348/143 |
| 6,456,737 B1 | * | 9/2002 | Woodfill et al. | 382/154 |
| 6,542,621 B1 | * | 4/2003 | Brill et al. | 382/103 |
| 6,597,800 B1 | * | 7/2003 | Murray et al. | 382/103 |
| 6,611,622 B1 | * | 8/2003 | Krumm | 382/170 |
| 6,738,518 B1 | * | 5/2004 | Minka et al. | 382/218 |
| 6,798,897 B1 | * | 9/2004 | Rosenberg | 382/107 |
| 7,092,566 B2 | * | 8/2006 | Krumm | 382/170 |
| 7,194,134 B2 | * | 3/2007 | Bradshaw | 382/226 |

(Continued)

FOREIGN PATENT DOCUMENTS

JP    7-31732 B    4/1995
(Continued)

OTHER PUBLICATIONS

International Search Report for PCT/JP2009/001584 mailed May 12, 2009.

(Continued)

*Primary Examiner* — Manav Seth

(57) ABSTRACT

In order to improve object detection precision, an object detection apparatus includes a posterior probability calculation portion utilizing an occurrence probability of a background and a foreground acquired by utilizing a characteristic quantity extracted from each pixel of an input image and a probability density function, a posterior probability of the previous background and foreground, and a conditional probability indicating a relation of an event (background or foreground) to the vicinity of an attentive pixel in a spatial direction and a relation of an event to the vicinity of the attentive pixel in a temporal direction so as to calculate a posterior probability of the background and the foreground from a probability model utilizing a tendency that the same event appears together in the vicinity of the attentive pixel in the spatial and temporal directions; and an object determination portion for determining an object from comparison between the posterior probabilities of the background and the foreground.

28 Claims, 8 Drawing Sheets

U.S. PATENT DOCUMENTS

| | | | | |
|---|---|---|---|---|
| 7,489,803 B2 * | 2/2009 | Haynes et al. | ................ | 382/103 |
| 7,515,739 B2 * | 4/2009 | Porter et al. | .................. | 382/118 |
| 7,706,603 B2 * | 4/2010 | Najafi et al. | ................. | 382/154 |
| 7,720,282 B2 * | 5/2010 | Blake et al. | ................... | 382/173 |
| 2010/0046799 A1 * | 2/2010 | Saptharishi et al. | .......... | 382/103 |

FOREIGN PATENT DOCUMENTS

| | | |
|---|---|---|
| JP | 8-44874 A | 2/1996 |
| JP | 9-81714 A | 3/1997 |
| JP | 11-353467 A | 12/1999 |
| JP | 2002324237 A | 11/2002 |
| JP | 2006155594 A | 6/2006 |
| JP | 2006185206 A | 7/2006 |
| JP | 2006236113 A | 9/2006 |

OTHER PUBLICATIONS

C. Stauffer et al., "Adaptive background mixture models for real-time tracking", IEEE Computer Society Conference on Computer Vision and Pattern Recognition, vol. 2, 1999, pp. 246-252.

* cited by examiner

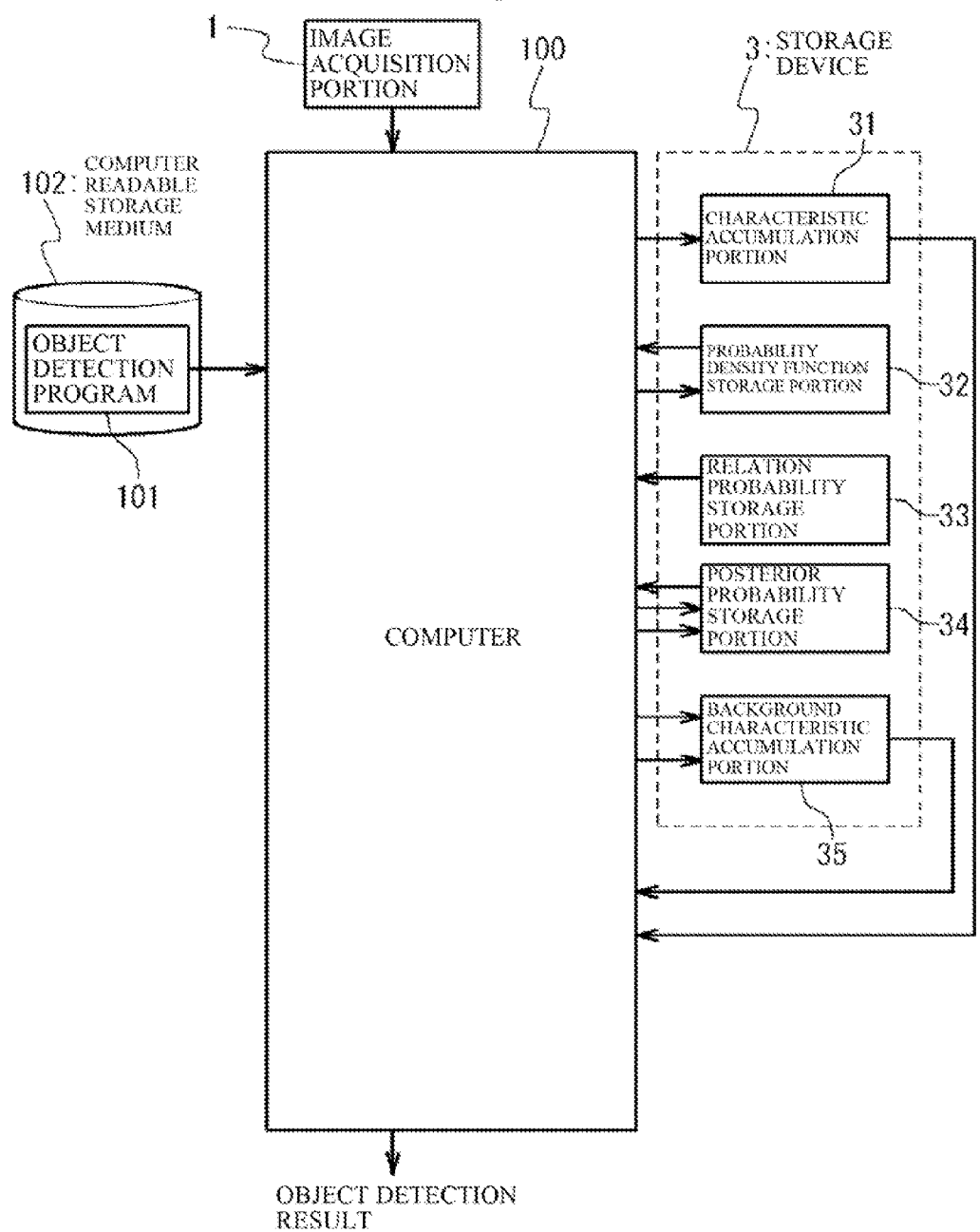

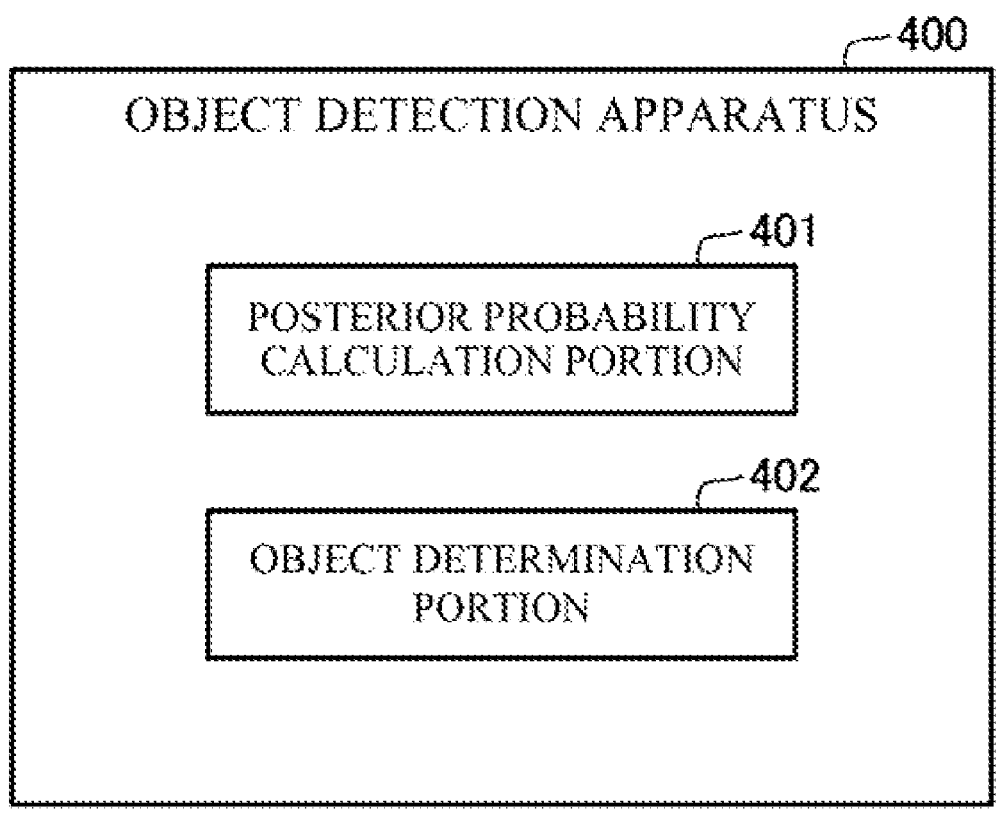

OBJECT DETECTION APPARATUS

TECHNICAL FIELD

The present invention relates generally to object detection apparatuses and, in particular, to an object detection apparatus for detecting an object from inside an image.

BACKGROUND ART

There are object detection methods utilized for detecting a target object from inside an image. As technologies related to the object detection methods, there are a background difference method and an interframe difference method.

The background difference method detects a target object by taking out the difference of an input image from its background image (an image which does not include the target object). According to the background difference method, it is possible to successfully detect a target object which moves at times and stops at other times. On the other hand, for the background difference method, it is necessary to prepare a background image which does not include the target object in advance. Further, a problem occurs that it is difficult to acquire a correct detection result when the background changes due to illuminative variation and the like.

On the other hand, the interframe difference method detects a target object by taking out the difference between input images different in time (interframe images). Different from the background difference method described hereinabove, the interframe difference method does not need to prepare a background image which does not include the target object in advance and, at the same time, is tolerant of background change due to a slow-paced variation in illumination such as environment light. However, with the interframe difference method, a problem occurs that only part of a target object (an outline and the like) can be detected with some image pattern of the target object. Further, with a motionless target object, another problem occurs that because the interframe image almost does not change, it is difficult to detect the target object.

For mending the problem with the background difference method described hereinabove, there are methods which sequentially update the background image. An example is described in the accompanying Patent Document 1. The method described in the Patent Document 1 sequentially updates the background image by a simple add-in method, and detects the target object by the background difference method with the updated background image. By virtue of this, because the sequentially updated background image is utilized, it is unnecessary to prepare a background image which does not include the target object in advance, and also possible to cope with background change due to a slow-paced variation in illumination such as environment light.

However, with the method disclosed in the Patent Document 1 described hereinabove, a problem occurs that when the target object moves slowly at times and stops at other times, the target object will be updated by the background image, thereby making it difficult to detect the target object. Further, the background update cannot catch up with a background which changes continuously such as with a wobbling tree, a fluctuant water surface, and the like (environmental changing). Thereby, it is difficult to appropriately detect the target object.

Therefore, for solving the problem described hereinabove, there are methods which estimate the background by approximating it to a mixture distribution model. An example is described in the accompanying Nonpatent Document 1. The method described in the Nonpatent Document 1 carries out the process by the pixel, estimates the background by the mixture distribution model from the time series of the pixel value regarded as the background, and seeks for a good fitness of an input pixel value to the background so as to detect the target object. In this manner, because the background is estimated only from the pixel value regarded as the background, even if the target object moves slowly at times and stops at other times, the target object will not be updated by the background. Thereby, a stable object detection is possible under those conditions. Further, because it is also possible to express a background which changes continuously such as with a wobbling tree, a fluctuant water surface, and the like as a mixture distribution model, a favorable object detection is also possible under those conditions.

Other technologies are also known in relation to the object detection methods. For example, the accompanying Patent Document 2 discloses a pattern recognition method utilizing a posterior probability. Further, the accompanying Patent Document 3 discloses an object detection method utilizing a probability value table of an occurrence probability.

[Patent Document 1] JP 07-31732 B
[Patent Document 2] JP 2006-155594 A
[Patent Document 3] JP 2006-185206 A
[Nonpatent Document 1] Stauffer and Grimson: "Adaptive background mixture models for real-time tracking", IEEE Computer Society Conference on Computer Vision and Pattern Recognition, Vol. 2, pp. 246-252, 1999.

However, with the technologies disclosed in the patent documents and nonpatent document described hereinabove, there are problems as described hereinbelow. The first problem is that there is a case that a part of the target object includes a pixel value similar to the background, thereby lowering the detection performance. The reason is that especially with the technology disclosed in the Nonpatent Document 1, even viewing from the background expressed by a mixture distribution model, it is still impossible to distinguish the portion of the object with a pixel value similar to the background from the ordinary background. Further, because of this, the pixel value of the target object mistakenly recognized as the background will be updated as the background, thereby lowering the estimation precision of the mixture distribution model for the background, and thereby affecting the object detection.

The second problem is that when the trend of the background changes in part for an instant (for example, when the wind changes in intensity instantaneously so that part of the tree changes in the manner of wobbling for an instant), during that instant, a small area of the background may be mistakenly detected as the object. The reason is that especially with the technology disclosed in the Nonpatent Document 1, even viewing from the background expressed by a mixture distribution model, it is still impossible to distinguish the small area of the background mistakenly detected from the ordinary foreground (target object).

Further, utilizing the technologies of the Patent Documents 2 and 3 described hereinbefore cannot solve those two problems either. That is, with the method utilizing a posterior probability or an occurrence probability only, the precision of object detection may still be lowered if a part of the target object includes a pixel value similar to the background, or if the trend of the background changes in part for an instant.

SUMMARY

In view of the above, an exemplary object of the present invention is to provide an object detection apparatus for solving the problem of the lowering of object detection precision described hereinabove.

In order to achieve this exemplary object, an aspect in accordance with the present invention provides an object detection apparatus including: a posterior probability calculation portion utilizing an occurrence probability of a background and a foreground acquired by utilizing a characteristic quantity extracted from each pixel of an input image and a probability density function, a posterior probability of the background and the foreground for the previous input image to the input image, and a conditional probability indicating a relation of an event (background or foreground) to the vicinity of an attentive pixel in a spatial direction and a relation of an event to the vicinity of the attentive pixel in a temporal direction so as to calculate a posterior probability of the background and the foreground from a probability model set up based on a tendency that the same event appears in the vicinity of the attentive pixel in the spatial and temporal directions; and an object determination portion for determining an object from comparison of the posterior probability of the background with that of the foreground.

Further, another aspect in accordance with the present invention provides a computer program product including computer implementable instructions to make a computer function as: a posterior probability calculation portion utilizing an occurrence probability of a background and a foreground acquired by utilizing a characteristic quantity extracted from each pixel of an input image and a probability density function, a posterior probability of the background and the foreground for the previous input image to the input image, and a conditional probability indicating a relation of an event (background or foreground) to the vicinity of an attentive pixel in a spatial direction and a relation of an event to the vicinity of the attentive pixel in a temporal direction so as to calculate a posterior probability of the background and the foreground from a probability model set up based on a tendency that the same event appears in the vicinity of the attentive pixel in the spatial and temporal directions; and an object determination portion for determining an object from comparison of the posterior probability of the background with that of the foreground.

Further, still another aspect in accordance with the present invention provides an object detection method including the steps of: calculating a posterior probability by utilizing an occurrence probability of a background and a foreground acquired by utilizing a characteristic quantity extracted from each pixel of an input image and a probability density function, a posterior probability of the background and the foreground for the previous input image to the input image, and a conditional probability indicating a relation of an event (background or foreground) to the vicinity of an attentive pixel in a spatial direction and a relation of an event to the vicinity of the attentive pixel in a temporal direction so as to calculate the posterior probability of the background and the foreground from a probability model set up based on a tendency that the same event appears in the vicinity of the attentive pixel in the spatial and temporal directions; and determining an object from comparison of the posterior probability of the background with that of the foreground.

By virtue of the configurations as described hereinabove, the present invention is able to restrain the mistaken detection in detecting the object from inside an image and, at the same time, mend the undetectable problem, thereby facilitating a high precision of object detection.

BRIEF DESCRIPTION OF THE DRAWINGS

FIG. 7 a block diagram showing an object detection apparatus in accordance with a third exemplary embodiment of the present invention; and FIG. 8 is a block diagram showing an object detection apparatus in accordance with a fourth exemplary embodiment of the present invention.

EXEMPLARY EMBODIMENTS

First Exemplary Embodiment

Detailed explanations will be made in reference to FIGS. 1 to 5 with respect to an object detection apparatus, an object detection method, and a computer program in accordance with a first exemplary embodiment of the present invention.

[Configurations]

Figure 1:
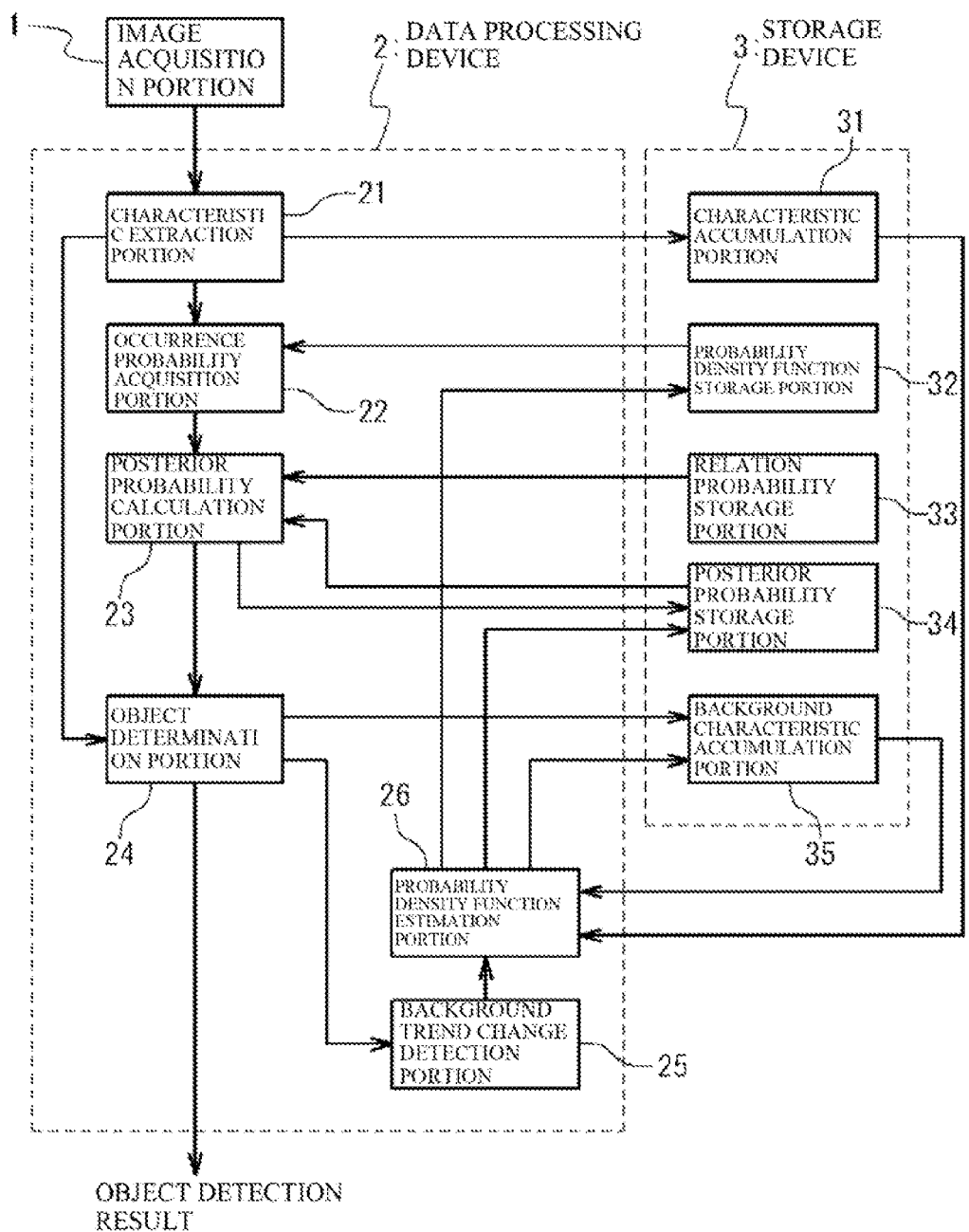
FIG. 1 is a block diagram showing an object detection apparatus in accordance with a first exemplary embodiment of the present invention.

In reference to FIG. 1, an object detection apparatus in accordance with the first exemplary embodiment of the present invention includes an image acquisition portion 1 for acquiring an image from a moving image of a camera, video, and the like, a data processing device 2 operative under computer control, and a storage device 3 for storing information.

Then, the storage device 3 includes a characteristic accumulation portion 31, a probability density function storage portion 32, a relation probability storage portion 33, a posterior probability storage portion 34, and a background characteristic accumulation portion 35. Hereinbelow, each configuration will be further described in detail.

The characteristic accumulation portion 31 provides a FIFO (First-In-First-Out) buffer which is a storage area for every pixel, and accumulates the characteristic quantity of each pixel in the FIFO buffer of the corresponding pixel, respectively.

The probability density function storage portion 32 provides a storage area for every pixel, and stores the probability density function of the background for each pixel in the storage area of the corresponding pixel. Besides, the probability density function will be described hereinafter.

Figure 2:
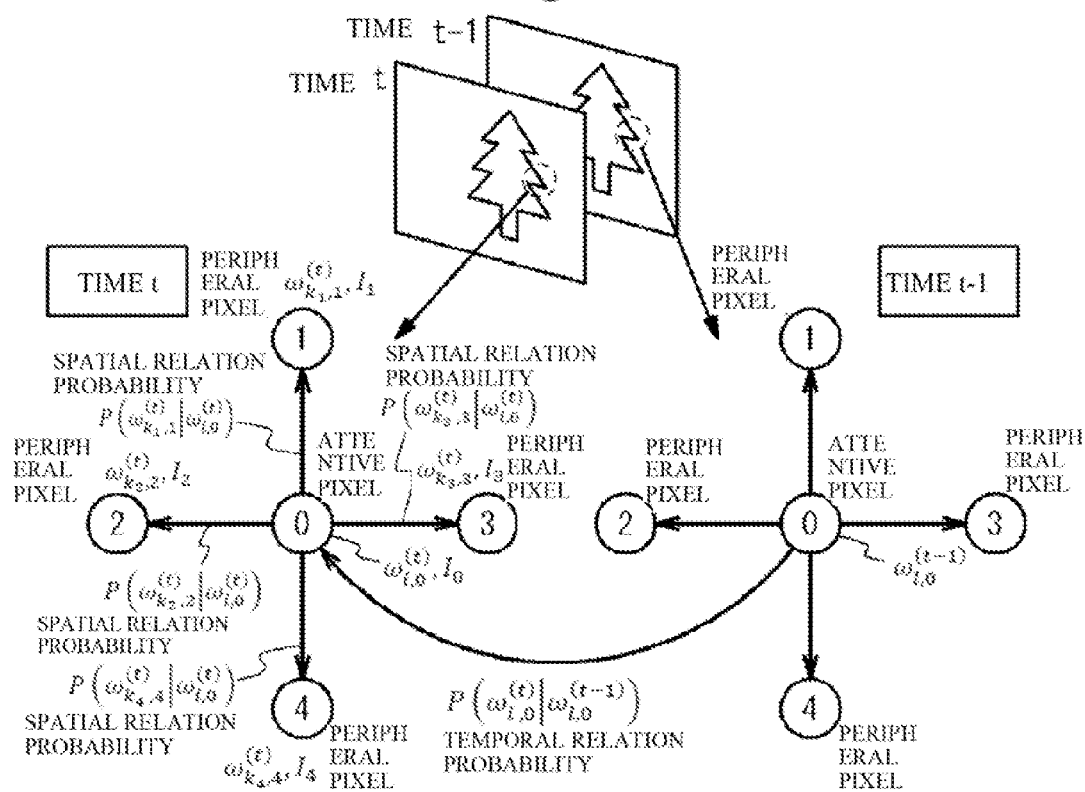
FIG. 2 shows a relation between pixels in a spatiotemporal direction in accordance with the first exemplary embodiment of the present invention.
Figure 3:
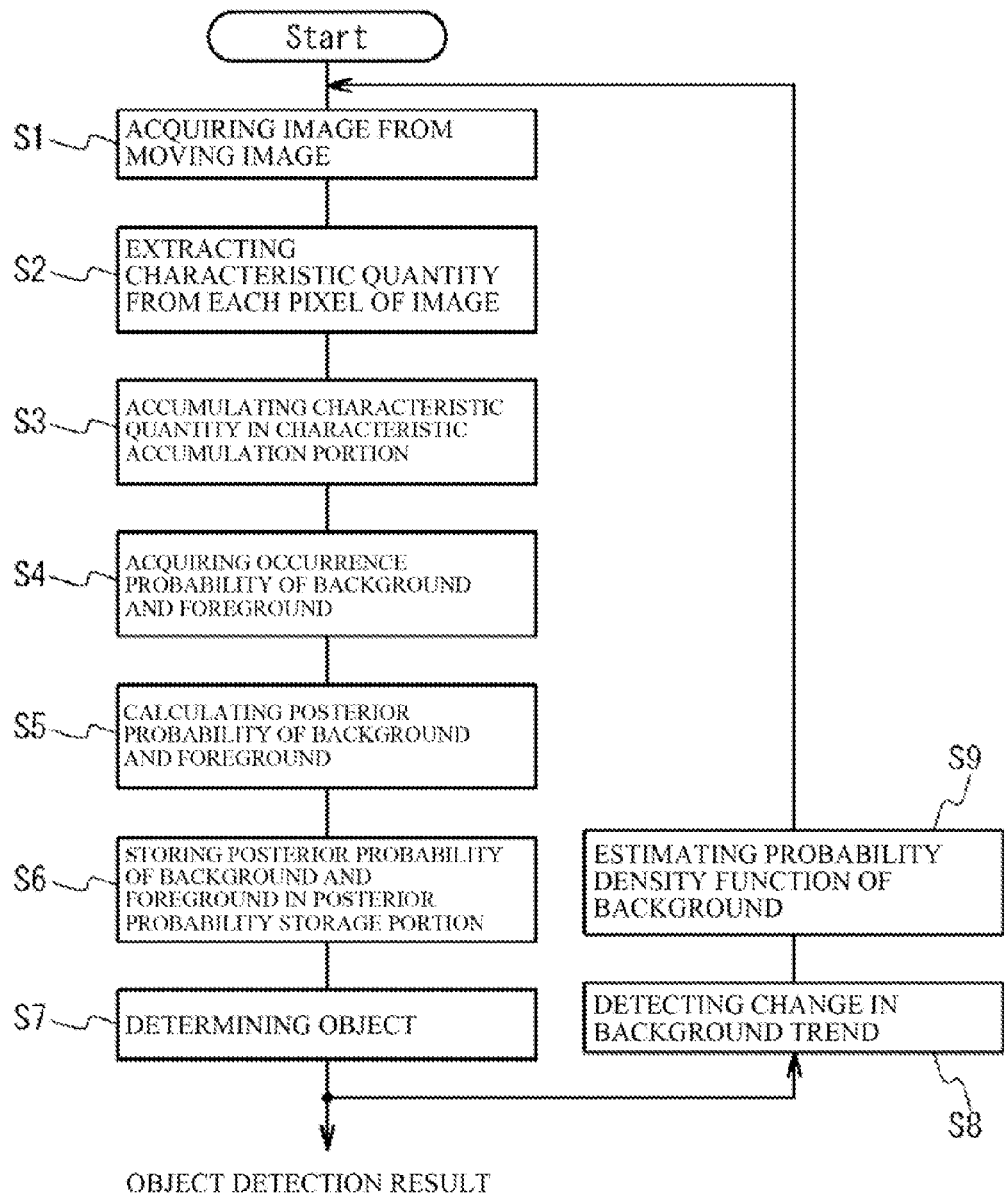
FIG. 3 is a flowchart showing a behavior of the object detection apparatus in accordance with the first exemplary embodiment of the present invention.

The relation probability storage portion 33 stores a "spatial relation probability" and a "temporal relation probability" shown in FIG. 2. Here in FIG. 2, an "attentive pixel" is a pixel of the processing object, while a "peripheral pixel" is a pixel in the vicinity of the attentive pixel. Then, still in FIG. 2, "time t" shows the present time, while "time t−1" shows the past time of the previous input image. Further, the "spatial relation probability" refers to an occurrence probability of an event of the peripheral pixel (background or foreground) when an event of the attentive pixel (background or foreground) occurs; that is, it shows a conditional probability indicating a relation of an event of the attentive pixel to the vicinity in a spatial direction. Then, "temporal relation probability" refers to an occurrence probability of an event of the present attentive pixel (background or foreground) when an event of the attentive pixel of the previous input image (background or foreground) occurs; that is, it shows a conditional probability indicating a relation of an event of the attentive pixel to the vicinity in a temporal direction.

The posterior probability storage portion 34 provides a storage area for every pixel, and stores the posterior probabilities of the background and the foreground in the storage area of the corresponding pixel. In addition, the initial value of the posterior probabilities of the background and the foreground is set at ½.

The background characteristic accumulation portion 35 provides a FIFO (First-In-First-Out) buffer which is a storage area for every pixel, and accumulates the characteristic quantity of the pixel determined as the background in the FIFO buffer of the corresponding pixel, respectively.

Further, the aforementioned data processing device 2 includes a characteristic extraction portion 21, an occurrence probability acquisition portion 22, a posterior probability calculation portion 23, an object determination portion 24, a background trend change detection portion 25, and a probability density function estimation portion 26. Hereinbelow, configurations will be described in detail with respect thereto. Further, the configuration of the data processing device 2 can be accomplished by installing a predetermined computer program in an arithmetic device provided in the data processing device 2. However, the configuration of the data processing device 2 is not limited to the accomplishment by installing a computer program, but may also be accomplished with a circuit.

lation portion 31. Herein, conceivable examples of the characteristic quantity to be extracted are: brightness value, hue, each value of RGB (Red, Green, and Blue), edge strength, value of optical flow, range value for a range image, value of integral by a spatial filter and the like, etc.

The occurrence probability acquisition portion 22 utilizes the characteristic quantity extracted by the characteristic extraction portion 21, and the probability density function of the background of the corresponding pixel in the probability density function storage portion 32 to acquire the occurrence probability of the background. Further, the occurrence probability acquisition portion 22 acquires the occurrence probability of the foreground as a uniform probability on the supposition that the probability density function of the foreground is uniformly distributed. For example, when the characteristic quantity is a brightness value, every state is denoted by 0 to 255; thereby, the occurrence probability of the foreground is regarded as 1/256.

The posterior probability calculation portion 23 utilizes the occurrence probabilities of the background and the foreground acquired by the occurrence probability acquisition portion 22, the spatial relation probability and the temporal relation probability stored in the relation probability storage portion 33, and the posterior probabilities of the previous background and foreground stored in the posterior probability storage portion 34 to calculate the posterior probabilities of the background and the foreground of each pixel with the following formula (I). Then, the posterior probability calculation portion 23 stores the calculated posterior probabilities in the posterior probability storage portion 34.

Formula (1)

$$P(\omega_{i,0}^{(t)} \mid I_0, \ldots, I_4) = \sum_{k_1=0}^{1}\sum_{k_2=0}^{1}\sum_{k_3=0}^{1}\sum_{k_4=0}^{1} P(\omega_{i,0}^{(t)}, \omega_{k_1,1}^{(t)}, \omega_{k_2,2}^{(t)}, \omega_{k_3,3}^{(t)}, \omega_{k_4,4}^{(t)} \mid I_0, \ldots, I_4)$$

$$= \frac{p(I_0 \mid \omega_{i,0}^{(t)})}{p(I_0, \ldots, I_4)} \left[\sum_{k_1=0}^{1}\sum_{k_2=0}^{1}\sum_{k_3=0}^{1}\sum_{k_4=0}^{1}\left\{\prod_{j=1}^{4} p(I_j \mid \omega_{k_j,j}^{(t)}) P(\omega_{k_j,j}^{(t)} \mid \omega_{i,0}^{(t)})\right\}\right] P(\omega_{i,0}^{(t)})$$

$$= \frac{p(I_0 \mid \omega_{i,0}^{(t)})}{p(I_0, \ldots, I_4)} \left[\sum_{k_1=0}^{1}\sum_{k_2=0}^{1}\sum_{k_3=0}^{1}\sum_{k_4=0}^{1}\left\{\prod_{j=1}^{4} p(I_j \mid \omega_{k_j,j}^{(t)}) P(\omega_{k_j,j}^{(t)} \mid \omega_{i,0}^{(t)})\right\}\right]\left\{\sum_{l=0}^{1} P(\omega_{i,0}^{(t)}, \omega_{l,0}^{(t-1)})\right\}$$

$$= \frac{p(I_0 \mid \omega_{i,0}^{(t)})}{p(I_0, \ldots, I_4)} \left[\sum_{k_1=0}^{1}\sum_{k_2=0}^{1}\sum_{k_3=0}^{1}\sum_{k_4=0}^{1}\left\{\prod_{j=1}^{4} p(I_j \mid \omega_{k_j,j}^{(t)}) P(\omega_{k_j,j}^{(t)} \mid \omega_{i,0}^{(t)})\right\}\right]\left\{\sum_{l=0}^{1} P(\omega_{i,0}^{(t)} \mid \omega_{l,0}^{(t-1)}) P(\omega_{l,0}^{(t-1)})\right\}$$

Wherein:

Formula (2)

$$\sum_{k_j=0}^{1} P(\omega_{k_j,j}^{(t)} \mid \omega_{i,0}^{(t)}) = 1$$

Formula (3)

$$\sum_{i=0}^{1} P(\omega_{i,0}^{(t)} \mid \omega_{l,0}^{(t-1)}) = 1$$

The characteristic extraction portion 21 extracts the characteristic quantity from each pixel of the image acquired by the image acquisition portion 1 (for example, the present image included in a moving image). Then, it accumulates the extracted characteristic quantity in the characteristic accumu- Herein, the "ω (t) a, b" in the above formulas indicates an event a (a=0: background; a=1: foreground) of a position b (b=0: attentive pixel; b≠0: peripheral pixel) at the time t.

"Ib" indicates the characteristic quantity of a position b (b=0: attentive pixel; b≠0: peripheral pixel) at the time t.

"p (I0|ω(t) i, 0)" indicates the occurrence probabilities of the background and the foreground of the attentive pixel.

"p (Ij|ω(t) kj, j)" indicates the occurrence probabilities of the background and the foreground of the peripheral pixel.

"P (ω(t) kj, j|ω(t) i, 0)" indicates the spatial relation probability.

"P (ω(t) i, 0|ω(t−1) 1, 0)" indicates the temporal relation probability.

"P (ω(t−1) i, 0)" is the prior probabilities of the background and the foreground of the previous input image. However, because the posterior probabilities are already known, herein, the posterior probabilities of the background and the foreground of the previous input image "P (ω(t−1) i, 0|I0, . . . , I4)" are utilized.

"p (I0, . . . , I4)" is the result of summing up the result calculated by removing "1/p (I0, . . . , I4)" from the formula (1) in seeking the posterior probability of the background "P (ω(t) 0, 0|I0, . . . , I4)", and the result calculated by removing "1/p (I0, . . . , I4)" from the formula (1) in seeking the posterior probability of the foreground "P (ω(t) 1, 0|I0, . . . , I4)".

Herein, in the vicinities of the spatial direction and the temporal direction in an image, events of the background and the foreground have such a nature or tendency as the same event tends to appear together. The above formula (1) is such that has modified the Bayes' theorem so as to reveal the spatial relation probability and the temporal relation probability capable of indicating the above nature or tendency. In order to satisfy the nature, with respect to the spatial relation probability "P (ω(t) kj, j|ω(t) i, 0)", the probability when kj=i is set to be higher than the probability when kj≠i. That is, the probability is set to become higher when an event of the attentive pixel is the same as an event of the peripheral pixel. Further, with respect to the temporal relation probability "P (ω(t) i, 0|ω(t−1) 1, 0)", the probability when i=1 is set to be higher than the probability when i≠1. That is, the probability is set to become higher when an event of the attentive pixel of the previous input image is the same as an event of the present attentive pixel. Thereby, it is possible to complement the precision of object determination for the attentive pixel with the information of the spatial direction and the information of the temporal direction.

The object determination portion 24 compares the posterior probabilities of the background and the foreground acquired by the posterior probability calculation portion 23 for each pixel, and takes the event of a higher posterior probability (background or foreground) as the result of object determination. Further, with respect to a pixel determined as the background, it accumulates the characteristic quantity of the corresponding pixel in the background characteristic accumulation portion 35.

The background trend change detection portion 25 observes the result of object determination acquired by the object determination portion 24 for each pixel in a time-series manner, and detects the pixel with a high appearance frequency of the foreground as a pixel with a change in background trend. This is based on an empirical rule that usually the background appears more often according to the time series of a pixel. Herein, as methods for determining a high appearance frequency of the foreground, for example, the following three are conceivable: (1) the method of increasing the count value at the time of the foreground, decreasing the count value at the time of the background, and determining when the count value exceeds a threshold value (the counter does not go below 0); (2) the method of observing a certain period in the past from the present time, and determining when the ratio of the foreground exceeds a threshold value; and (3) the method of counting the number of consecutive appearances of the foreground, and determining when the number exceeds a threshold value. However, as long as it is possible to determine a high appearance frequency of the foreground, any kind of method may be utilized.

The probability density function estimation portion 26 estimates the probability density function of the background for each pixel on the basis of the detection result acquired by the background trend change detection portion 25. In particular, with respect to the pixel which has not been detected in the detection result, because the trend of the background has not changed, it estimates the probability density function of the background from the characteristic quantity of the background accumulated in the background characteristic accumulation portion 35. On the other hand, with respect to the pixel which has been detected in the detection result, because the trend of the background has changed, the initialization is necessary, and thereby the background characteristic accumulation portion 35 is not utilized. Thus, the probability density function of the background is estimated from the characteristic quantity accumulated in the characteristic accumulation portion 31. Further, with respect to the corresponding pixel, the probability density function estimation portion 26 initializes the posterior probabilities of the background and the foreground of the posterior probability storage portion 34 to ½, and copies the FIFO buffer of the characteristic accumulation portion 31 to the FIFO buffer of the background characteristic accumulation portion 35 for the initialization. In addition, the method for estimating the probability density function may be any kind as long as the probability density function can be estimated such as: histogram method, Parzen estimation, EM (Expectation-Maximization) algorithm, and the like. Further, the characteristic quantity utilized for estimating the probability density function may utilize either the characteristic quantity accumulated for each pixel or the characteristic quantity accumulated for each pixel and its peripheral pixels. Then, the probability density function estimation portion 26 stores the estimated probability density function of the background for each pixel in the probability density function storage portion 32.

Herein, various methods are conceivable for setting initial values of the characteristic accumulation portion 31 and the background characteristic accumulation portion 35 such as: the method in which in an offline process, another data processing device extracts the characteristic quantity for a plurality of images from the moving image acquired by the image acquisition portion 1, and sets the characteristic quantity extracted in advance as the initial value; the method of setting a normal distribution data as the initial value, which takes the characteristic quantity extracted by the characteristic extraction portion 21 from the image of the first frame among the images from the image acquisition portion 1 as an average value; and the like. Further, as methods for setting an initial value of the probability density function storage portion 32, these are conceivable such as the method of estimating the probability density function of the background from the background characteristic accumulation portion 35 with a initial value set as explained hereinbefore, and setting it as the initial value, and the like. Still other methods are conceivable such as after accumulating the characteristic quantity extracted by the characteristic extraction portion 21 in the characteristic accumulation portion 31 for the images corresponding to the first few frames among the images from the image acquisition portion 1, forcibly copying the whole characteristic accumulation portion 31 to the background characteristic accumulation portion 35, estimating every probability density function of the background from the background characteristic accumulation portion 35, and setting the estimation result as the initial value of the probability density function storage portion 32.

Further, in the above explanation, as peripheral pixels, four pixels located in the vicinity of an attentive pixel have been shown. However, any number of pixels may be applied as long as in the vicinity of an attentive pixel. Further, FIG. 2 also shows four vicinal pixels. However, as long as in the vicinity of an attentive pixel, any number of pixels other than four may also be applied.

[Behavior]

Next, in reference to FIGS. 1, 3, 4, and 5, detailed explanations will be made with respect to a behavior of the object detection apparatus in accordance with the first exemplary embodiment of the present invention.

First, the image acquisition portion 1 acquires an image from a moving image of a camera, video, and the like (step S1). Subsequently, the characteristic extraction portion 21 extracts the characteristic quantity from each pixel of the image acquired by the image acquisition portion 1 (step S2), and accumulates these characteristic quantities in the characteristic accumulation portion 31 (step S3). Subsequently, the occurrence probability acquisition portion 22 utilizes the characteristic quantity extracted by the characteristic extraction portion 21, and the probability density function of the background of the corresponding pixel in the probability density function storage portion 32 to acquire the occurrence probability of the background. Further, the occurrence probability acquisition portion 22 acquires the occurrence probability of the foreground as a uniform probability. Then, the above process is carried out for every pixel (step S4).

Subsequently, the posterior probability calculation portion 23 utilizes the occurrence probabilities of the background and the foreground for the attentive pixel and the peripheral pixel acquired by the occurrence probability acquisition portion 22, the spatial relation probability and the temporal relation probability stored in the relation probability storage portion 33, and the posterior probabilities of the background and the foreground for the previous attentive pixel stored in the posterior probability storage portion 34 to calculate the posterior probabilities of the background and the foreground for the attentive pixel from the formula (1). Then, the posterior probability calculation portion 23 carries out the above calculation process for every pixel (step S5). Subsequently, it stores all calculated posterior probabilities of the background and the foreground in the posterior probability storage portion 34 (step S6). Then, the object determination portion 24 utilizes the calculated posterior probabilities of the background and the foreground to determine whether the corresponding pixel is the background or the foreground (step S7).

Figure 4:
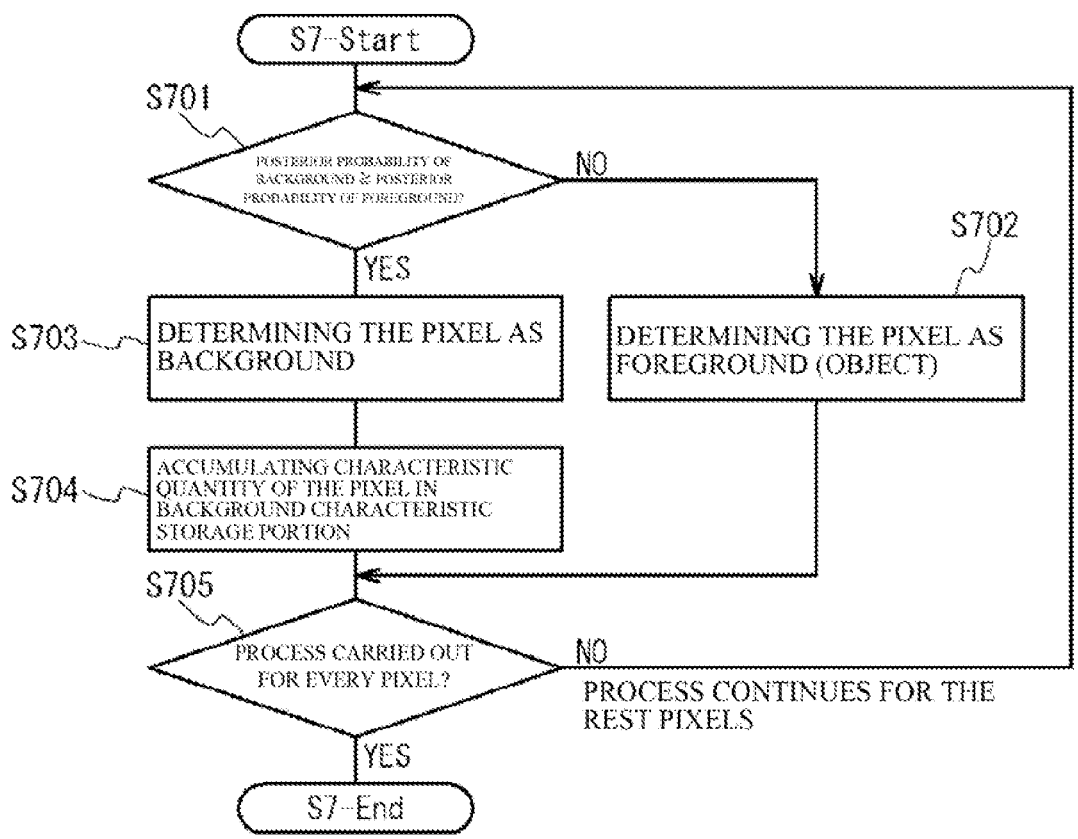
FIG. 4 is another flowchart showing the behavior of the object detection apparatus in accordance with the first exemplary embodiment of the present invention.

Next, a detailed explanation will be made with respect to a behavior of the object determination process of the step S7 in reference to FIG. 4. First, the object determination portion 24 compares the posterior probability of the background with the posterior probability of the foreground for a certain pixel (step S701). Then, if the posterior probability of the background is lower (step S701: No), the corresponding pixel is determined as the foreground or object (step S702). Otherwise (step S701: Yes), the corresponding pixel is determined as the background (step S703), and the characteristic quantity of the corresponding pixel is accumulated in the background characteristic accumulation portion 35 (step S704). Then, after the process of the step S702 or S704 is finished, the object determination portion 24 confirms whether or not the process from the step S701 to the step S704 has been carried out for all pixels (step S705), and repeats the process from the step S701 to the step S704 until the process is finished for all pixels.

Subsequently, the background trend change detection portion 25 observes the object determination result acquired by the object determination portion 24 through the process of the step S7 described hereinbefore (the flowchart of FIG. 4) for each pixel in a time-series manner, and detects the pixel with a high appearance frequency of the foreground as a pixel with a change in the trend of the background (step S8). Then, based on the detection result acquired by the background trend change detection portion 25, the probability density function estimation portion 26 estimates the probability density function of the background for each pixel (step S9).

Figure 5:
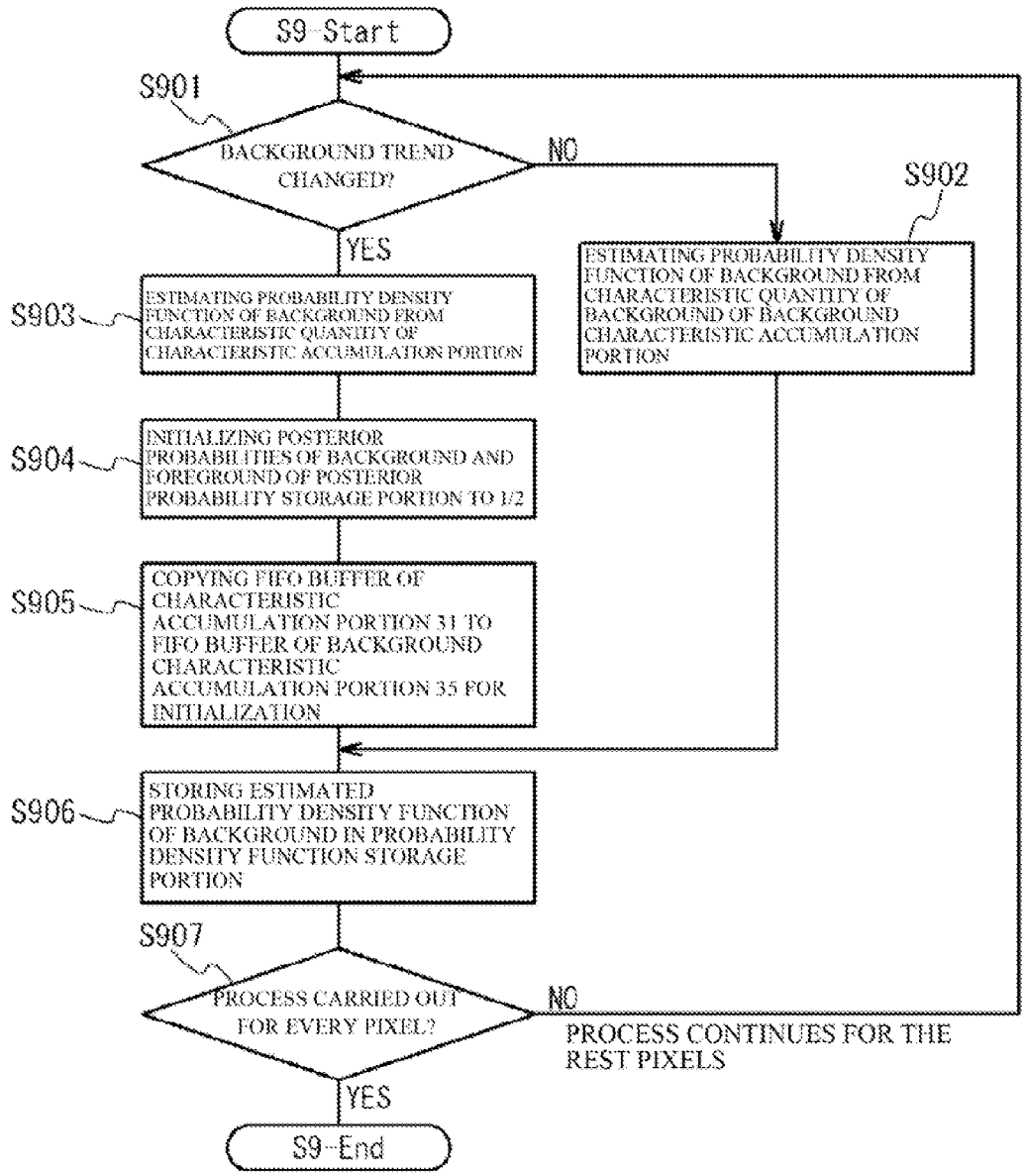
FIG. 5 is still another flowchart showing the behavior of the object detection apparatus in accordance with the first exemplary embodiment of the present invention.

Herein, a detailed explanation will be made with respect to a behavior of the step S9 in reference to FIG. 5. First, based on the detection result acquired by the background trend change detection portion 25, the probability density function estimation portion 26 determines whether or not the trend of the background has changed for a certain pixel (step S901). At the time, if the trend of the background has not changed (step S901: No), it estimates the probability density function of the background from the characteristic quantity of the background accumulated in the background characteristic accumulation portion 35 (step S902). On the other hand, if the trend of the background has changed (step S901: Yes), the initialization is necessary, and thereby the probability density function of the background is estimated from the characteristic quantity accumulated in the characteristic accumulation portion 31 (step S903). At the time, further, with respect to the corresponding pixel, the probability density function estimation portion 26 initializes the posterior probabilities of the background and the foreground of the posterior probability storage portion 34 to ½ (step S904), and copies the FIFO buffer of the characteristic accumulation portion 31 to the FIFO buffer of the background characteristic accumulation portion 35 for the initialization (step S905). Then, on finishing the process of the step S902 or S905, the probability density function estimation portion 26 stores the estimated probability density function of the background in the probability density function storage portion 32 (step S906). Thereafter, it confirms whether or not the process from the step S901 to the step S906 has been carried out for all pixels (step S907), and repeats the process from the step S901 to the step S906 until the process is finished for all pixels.

In the above manner, in the first exemplary embodiment, in the vicinities of the spatial and temporal directions of an attentive pixel in an image, the object is detected by utilizing a probability model which utilizes the nature or tendency that the same event (background or foreground) tends to appear together. Therefore, when an attentive pixel is the "ordinary background", the background probability becomes higher for each of the occurrence probability of the attentive pixel, the occurrence probability of the peripheral pixel, and the posterior probability of the attentive pixel in the previous input image. Thereby, the attentive pixel is determined as the background. On the other hand, in the case of "the object having a pixel value similar to the background", although the occurrence probability of the background becomes higher for the attentive pixel, the probability of the background becomes lower for the occurrence probability of the peripheral pixel and the posterior probability of the attentive pixel in the previous input image because they exist inside the object and the like. Thereby, it is distinguished from the ordinary background and determined as the foreground. Hence, it is possible to distinguish the object having a pixel value similar to the background from the ordinary background, thereby making it possible to improve the performance of object detection.

Further, in the first exemplary embodiment, because in the vicinities of the spatial and temporal directions of an attentive pixel in an image, the object is, as described hereinabove, detected by utilizing a probability model which utilizes the nature or tendency that the same event (background or foreground) tends to appear together, there is a further effect as described hereinbelow. That is, in the case of the "ordinary foreground" in an image, the background probability becomes lower for each of the occurrence probability of the attentive pixel, the occurrence probability of the peripheral pixel, and the posterior probability of the attentive pixel in the previous input image. Thereby, the attentive pixel is determined as the foreground. On the other hand, in the case of "a small area of the background mistakenly detected when the trend of the background has changed in part for an instant" in an image, although the occurrence probability of the background becomes lower for the attentive pixel, the probability of the background becomes higher for the occurrence probability of the peripheral pixel, and the posterior probability of the attentive pixel in the previous input image because the area is small in size and thus a large portion is in contact with background, the occurrence time of the area is short, etc. Thereby, it is distinguished from the ordinary foreground and thus determined as the background. Hence, it is possible to distinguish the small area of the background illustrated in the above explanation from the ordinary foreground so as to restrain the false detection.

Further, in the first exemplary embodiment, based on the empirical rule that usually the background appears more often according to the time series of a pixel, the pixel with a high appearance frequency of the foreground is detected as a pixel with a change in the trend of the background, and the probability density function of the background is estimated by taking out the sequentially accumulated characteristic quantity from the characteristic accumulation portion 31 of the corresponding pixel. Thereby, these cases can be regarded as the background: a vehicle has been parked for a long time; a tree has changed greatly in wobbling manner due to a change in direction of the wind; and the like.

A Second Exemplary Embodiment

Next, a detailed explanation will be made with respect to an object detection apparatus in accordance with a second exemplary embodiment of the present invention in reference to FIG. 6.

Figure 6:
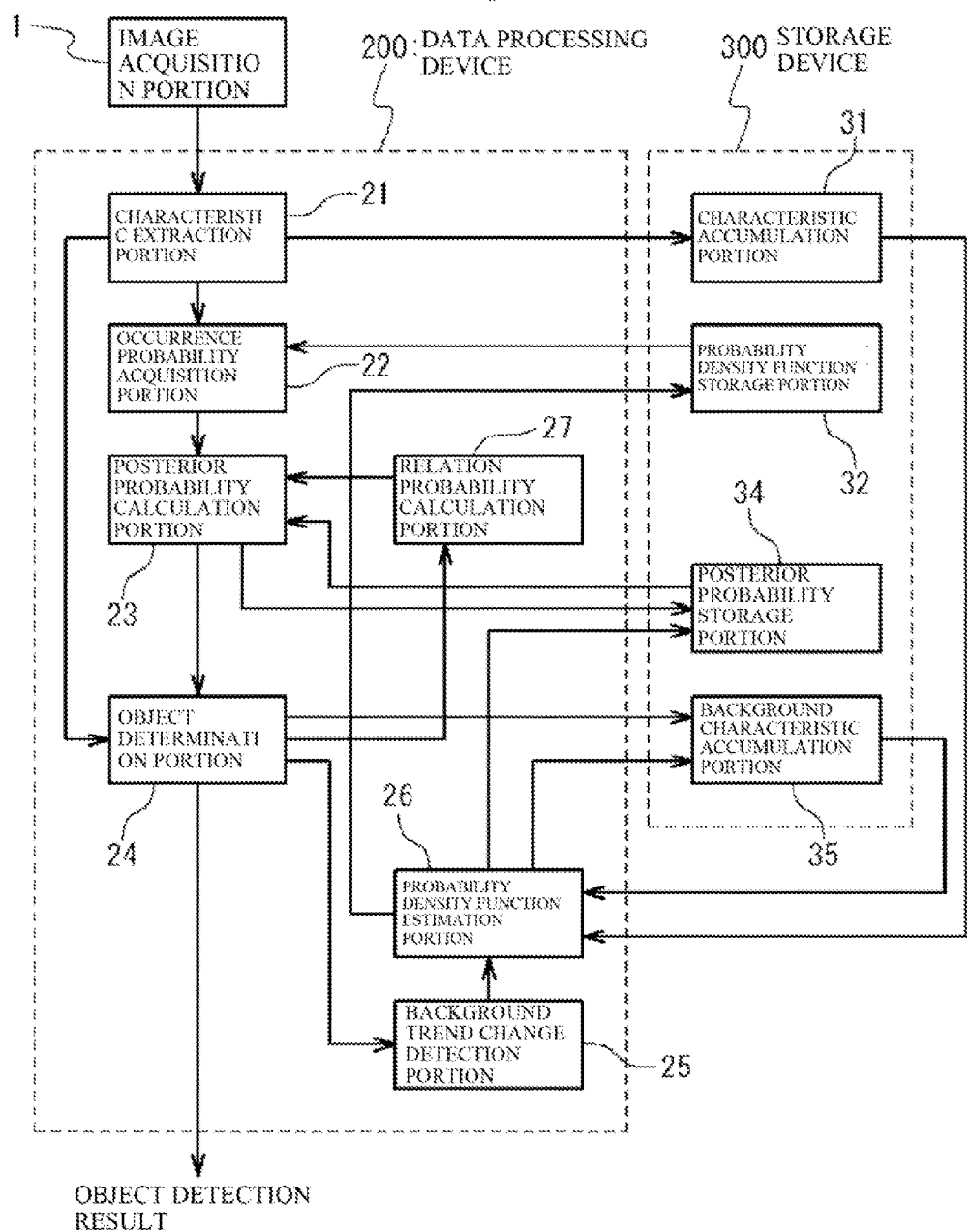
FIG. 6 is a block diagram showing an object detection apparatus in accordance with a second exemplary embodiment of the present invention.

In reference to FIG. 6, the object detection apparatus in accordance with the second exemplary embodiment of the present invention includes a data processing device 200 which adds a relation probability calculation portion 27 to the data processing device 2 in the first exemplary embodiment shown in FIG. 1, and a storage device 300 which removes the relation probability storage portion 33 from the storage device 3 in the first exemplary embodiment shown in FIG. 1. That is, in the first exemplary embodiment described hereinbefore, the spatial relation probability and the temporal relation probability were configured in a fixed manner. However, as will be explained hereinbelow, it is possible to utilize the relation probability calculation portion 27 to configure them in an unfixed or variable manner.

For example, when an attentive pixel is determined as the background, the relation probability calculation portion 27 sequentially counts the number $n1$ of the peripheral pixels determined as the background and the number $n2$ of the peripheral pixels determined as the foreground. Then, it utilizes the counted value to calculate the spatial relation probability $n1/(n1+n2)$ when the attentive pixel is the background while the peripheral pixel is the background, and the spatial relation probability $n2/(n1+n2)$ when the attentive pixel is the background while the peripheral pixel is the foreground. On the other hand, when an attentive pixel is determined as the foreground, the relation probability calculation portion 27 sequentially counts the number $n3$ of the peripheral pixels determined as the background and the number $n4$ of the peripheral pixels determined as the foreground. Then, it utilizes the counted value to calculate the spatial relation probability $n3/(n3+n4)$ when the attentive pixel is the foreground while the peripheral pixel is the background, and the spatial relation probability $n4/(n3+n4)$ when the attentive pixel is the foreground while the peripheral pixel is the foreground. In this manner, with these calculated values, the spatial relation probability is set to be variable.

Further, when the previous attentive pixel is determined as the background, the relation probability calculation portion 27 sequentially counts the number $n5$ of the present attentive pixels determined as the background and the number $n6$ of the present attentive pixels determined as the foreground. Then, it utilizes the counted value to calculate the temporal relation probability $n5/(n5+n6)$ when the previous attentive pixel is the background while the present attentive pixel is the background, and the temporal relation probability $n6/(n5+n6)$ when the previous attentive pixel is the background while the present attentive pixel is the foreground. On the other hand, when the previous attentive pixel is determined as the foreground, the relation probability calculation portion 27 sequentially counts the number $n7$ of the present attentive pixels determined as the background and the number $n8$ of the present attentive pixels determined as the foreground. Then, it utilizes the counted value to calculate the temporal relation probability $n7/(n7+n8)$ when the previous attentive pixel is the foreground while the present attentive pixels are the background, and the temporal relation probability $n8/(n7+n8)$ when the previous attentive pixel is the foreground while the present attentive pixel is the foreground. In this manner, with these calculated values, the temporal relation probability is set to be variable.

Further, in calculating the spatial relation probability and the temporal relation probability described hereinabove, a condition is made as follows: for example, the spatial relation probability that an event of the attentive pixel is the same as an event of the peripheral pixel should not be lower than ½ (½ or higher); Further, the temporal relation probability that an event of the previous attentive pixel is the same as an event of the present attentive pixel should not be lower than ½ (½ or higher).

As described hereinabove, in the second exemplary embodiment, in the same manner as the first exemplary embodiment, it is possible to restrain the mistaken detection of the object and, at the same time, mend the undetectable problem, thereby facilitating a high detection precision. Then, particularly, in the second exemplary embodiment, because the posterior probability is, in the same manner as described hereinabove, calculated by utilizing the spatial relation probability and the temporal relation probability which are calculated and set according to the characteristics of an image of the object detection target, it is possible to further improve the object detection precision.

A Third Exemplary Embodiment

Next, a detailed explanation will be made with respect to an object detection apparatus in accordance with a third exemplary embodiment of the present invention in reference to FIG. 7.

In reference to FIG. 7, in the object detection apparatus in accordance with the third exemplary embodiment of the present invention, the image acquisition portion 1, and the storage device 3 having the characteristic accumulation portion 31, the probability density function storage portion 32, the relation probability storage portion 33, the posterior probability storage portion 34, and the background characteristic accumulation portion 35, which are the same as those in the first exemplary embodiment, are connected with a computer 100. Further, a computer-readable storage medium 102 for storing an object detection program 101 is connected with the computer 100.

The computer-readable storage medium 102 is configured by a magnetic disk, a semiconductor memory, and the like. Then, at the time of starting up the computer 100, etc., the object detection program 101 stored in the computer-readable storage medium 102 is read out by the computer 100 and, by controlling the behavior of the computer 100, makes the computer 100 function as the characteristic extraction portion 21, the occurrence probability acquisition portion 22, the posterior probability calculation portion 23, the object determination portion 24, the background trend change detection portion 25, and the probability density function estimation portion 26 in the data processing device 2 in the first exemplary embodiment described hereinbefore, respectively, so as to carry out the process shown in FIGS. 3 to 5.

In the third exemplary embodiment, the object detection apparatus in accordance with the first exemplary embodiment is accomplished with the computer and computer program. However, it is also possible to accomplish the object detection apparatus in accordance with the second exemplary embodiment with the computer and computer program.

Further, in each of the exemplary embodiments, it was explained that a one-dimensional characteristic quantity was utilized such as: brightness value, hue, each value of RGB (Red, Green, and Blue), edge strength, value of optical flow, range value for a range image, value of integral by a spatial filter and the like, etc., as the characteristic quantity acquired from the characteristic extraction portion 21. However, instead of a one-dimensional characteristic quantity, it is also possible to utilize a two-dimensional or multidimensional characteristic vector combining those values.

Further, in each of the exemplary embodiments, it was explained that the characteristic quantity was utilized by the pixel. However, instead of the characteristic quantity by the pixel, it is also possible to set up a local area in the image, and utilize the characteristic quantity and the characteristic vector by the block acquired therefrom. The block in the image may be set up either in an overlap arrangement or in a nonoverlap arrangement.

Further, in each of the exemplary embodiments, it was explained that the occurrence probability acquisition portion 22 acquired the occurrence probability of the foreground as a uniform probability on the supposition that the probability density function of the foreground was uniformly distributed. However, when a target object to be detected is predetermined, etc., it is also possible to estimate the probability density function of the foreground by analyzing the target object in advance, and then utilize the estimated probability density function of the foreground and the characteristic quantity extracted by the characteristic extraction portion 21 so as to acquire the occurrence probability of the foreground.

Further, the object detection apparatus in accordance with the exemplary embodiments adopts the following configuration as an example. That is, the object detection apparatus includes a posterior probability calculation portion and an object determination portion. The posterior probability calculation portion utilizes the occurrence probabilities of the background and the foreground acquired by utilizing the characteristic quantity extracted from each pixel of an input image, and the probability density function; the posterior probabilities of the background and the foreground for the previous input image to the input image; and the conditional probabilities indicating the relation of an event of an attentive pixel (background or foreground) to the vicinity of the spatial direction and the relation of an event of an attentive pixel to the vicinity of the temporal direction, so as to calculate the posterior probabilities of the background and the foreground from the probability model set up on the basis of the nature or tendency that the same event appears in the vicinity of the attentive pixel in both the spatial and temporal directions. Then, the object determination portion determines the object from comparison of the posterior probabilities of the background and the foreground.

The object detection apparatus utilizes the relation of an event of an attentive pixel to the vicinity of the spatial direction and the relation of an event of an attentive pixel to the vicinity of the temporal direction to distinguish the portion of an object having a pixel value similar to the background from the ordinary background, thereby being able to distinguish a small area of the background mistakenly detected when the trend of the background has changed in part for an instant. As a result, the object detection performance is improved.

In addition, it is preferable that the characteristic extraction portion extracts the characteristic quantity, and the probability density function is in the probability density function storage portion. Further, it is also preferable that the posterior probability storage portion stores the posterior probability, and the relation probability storage portion stores the conditional probability.

The present invention is applicable to object detection apparatuses which distinguish the object having a pixel value similar to the background from the ordinary background in detecting a target object from the background with environmental and illuminative variations, and distinguish a small area of the background mistakenly detected when the trend of the background has changed in part for an instant from the ordinary foreground; and to computer programs for accomplishing the object detection apparatus with a computer. Further, it is also applicable to monitoring purposes requiring detection of objects from cameras or accumulation images such as apparatuses or functions for carrying out intruder detection, suspicious person detection, left-behind suspicious object detection, carried-away belongings detection, tailgating detection, and crowding and queuing detection. Further, it is also applicable to input interfaces with an object detection position from a camera or an accumulation image as its input. Furthermore, it is also applicable to video/image detection apparatuses and functions with object detection as a trigger.

A Fourth Exemplary Embodiment

Next, a fourth exemplary embodiment of the present invention will be explained in reference to FIG. 8. FIG. 8 is a functional block diagram showing a configuration of an object detection apparatus in accordance with the fourth exemplary embodiment. Further, in the fourth exemplary embodiment, an outline will be explained for the object detection apparatus described hereinabove.

As shown in FIG. 8, the object detection apparatus in accordance with the fourth exemplary embodiment includes: a posterior probability calculation portion utilizing an occurrence probability of a background and a foreground acquired by utilizing a characteristic quantity extracted from each pixel of an input image and a probability density function, a posterior probability of the background and the foreground for the previous input image to the input image, and a conditional probability indicating a relation of an event (background or foreground) to the vicinity of an attentive pixel in a spatial direction and a relation of an event to the vicinity of the attentive pixel in a temporal direction so as to calculate a posterior probability of the background and the foreground from a probability model set up based on a tendency that the same event appears in the vicinity of the attentive pixel in the spatial and temporal directions; and an object determination portion for determining an object from comparison of the posterior probability of the background with that of the foreground.

Further, in the object detection apparatus, the following configuration is adopted: the conditional probability is an occurrence probability of an event of a peripheral pixel in the vicinity of the spatial direction when an event of the attentive pixel (background or foreground) occurs, and an occurrence probability of an event of the present attentive pixel in the vicinity of the temporal direction when an event of the attentive pixel of the previous input image occurs.

Further, in the object detection apparatus, the following configuration is adopted: in the vicinity of the spatial direction, the conditional probability is set higher in the case that the event of the attentive pixel is the same as the event of the peripheral pixel than in the case that they are different; and in the vicinity of the temporal direction, the conditional probability is set higher in the case that the event of the attentive pixel of the previous input image is the same as the event of the present attentive pixel than in the case that they are different.

Further, in the object detection apparatus, the following configuration is adopted: from a determination result of the object determination portion, the conditional probability sequentially counts a number with respect to totally four cases that the peripheral pixel is determined as the background or the foreground when the attentive pixel is determined as the background or the foreground, and other totally four cases that the present attentive pixel is determined as the background or the foreground when the attentive pixel of the previous input image is determined as the background or the foreground, and utilizes the number to self-update.

Further, in the object detection apparatus, the following configuration is adopted: the conditional probability should neither be lower than ½ when the event of the attentive pixel is the same as the event of the peripheral pixel in the vicinity of the spatial direction nor be lower than ½ when the event of the attentive pixel of the previous input image is the same as the event of the present attentive pixel in the vicinity of the temporal direction.

Further, in the object detection apparatus, the following configuration is adopted: the probability density function of the background in the probability density functions observes a determination result of the object determination portion in a time-series manner, and is estimated from the characteristic quantity sequentially accumulated as the background has changed in trend if an appearance frequency of the foreground is high, while from the characteristic quantity accumulated when the determination result is determined as the background by the object determination portion as the background has not changed in trend if the appearance frequency of the foreground is low.

Further, in the object detection apparatus, the following configuration is adopted: the characteristic quantity is a two-dimensional or multidimensional characteristic vector combining a plurality of one-dimensional characteristic quantities.

Further, in the object detection apparatus, the following configuration is adopted: the characteristic quantity is a characteristic quantity and a characteristic vector with a block acquired from a local area set up in the image as a unit.

Further, in the object detection apparatus, the following configuration is adopted: the probability density function of the foreground in the probability density functions is uniformly distributed.

Further, in the object detection apparatus, the following configuration is adopted: the probability density function of the foreground in the probability density functions is a probability density function estimated by analyzing the target object to be detected in advance.

Further, in the object detection apparatus, the following configuration is adopted: the object determination portion compares the posterior probabilities of the background and the foreground acquired by the posterior probability calculation portion to determine the object as the background if the posterior probability of the background is higher and as the foreground if the posterior probability of the foreground is higher.

Further, the object detection apparatus in accordance with the fourth exemplary embodiment particularly includes: a posterior probability calculation portion for calculating a posterior probability of a foreground for an attentive pixel and a posterior probability of a background for the attentive pixel as the posterior probability of the foreground and the posterior probability of the background for the attentive pixel of a present image included in a moving image; and an object determination portion for determining an object based on comparison of the posterior probability of the foreground for the attentive pixel with the posterior probability of the background for the attentive pixel.

Further, the posterior probability calculation portion adopts the configuration of calculating the posterior probability of the background for the attentive pixel based on: an occurrence probability of the background for the attentive pixel as the occurrence probability of the background of the attentive pixel; an occurrence probability of the background for a peripheral pixel as the occurrence probability of the background of the peripheral pixel which is a pixel of the present image and located in the vicinity of the attentive pixel; a first spatial relation probability indicating a probability that the peripheral pixel becomes the background when the attentive pixel is the background; an occurrence probability of the foreground for the peripheral pixel as the occurrence probability of the foreground of the peripheral pixel; a second spatial relation probability indicating a probability that the peripheral pixel becomes the foreground when the attentive pixel is the background; a posterior probability, of the background for a past pixel as the posterior probability of the background of the past pixel which is a pixel of a past image included in the moving image and corresponds to the attentive pixel; a first temporal relation probability indicating a probability that the attentive pixel becomes the background when the past pixel is the background; a posterior probability of the foreground for the past pixel as the posterior probability of the foreground of the past pixel; and a second temporal relation probability indicating a probability that the attentive pixel becomes the background when the past pixel is the foreground.

Further, the posterior probability calculation portion adopts the configuration of calculating the posterior probability of the foreground for the attentive pixel based on: an occurrence probability of the foreground for the attentive pixel as the occurrence probability of the foreground of the attentive pixel; the occurrence probability of the background for the peripheral pixel; a third spatial relation probability indicating a probability that the peripheral pixel becomes the background when the attentive pixel is the foreground; the occurrence probability of the foreground for the peripheral pixel; a fourth spatial relation probability indicating a probability that the peripheral pixel becomes the foreground when the attentive pixel is the foreground; the posterior probability of the background for the past pixel; a third temporal relation probability indicating a probability that the attentive pixel becomes the foreground when the past pixel is the background; the posterior probability of the foreground for the past pixel; and a fourth temporal relation probability indicating a probability that the attentive pixel becomes the foreground when the past pixel is the foreground, wherein the first spatial relation probability being higher than the second spatial relation probability; the fourth spatial relation probability being higher than the third spatial relation probability; the first temporal relation probability being higher than the third temporal relation probability; and the fourth temporal relation probability being higher than the second temporal relation probability.

Further, the object detection apparatus adopts the following configuration: it further includes a relation probability calculation portion; the sum of the first spatial relation probability and the second spatial relation probability is 1, the sum of the fourth spatial relation probability and the third spatial relation probability is 1, the sum of the first temporal relation probability and the third temporal relation probability is 1, and the sum of the fourth temporal relation probability and the second temporal relation probability is 1.

Further, the relation probability calculation portion adopts the following configuration: it calculates a first spatial relation probability value, a fourth spatial relation probability value, a first temporal relation probability value, and a fourth temporal relation probability value; sets the first spatial relation probability at the first spatial relation probability value when the first spatial relation probability value is equal to or higher than ½, sets the first spatial relation probability at a value equal to or higher than ½ when the first spatial relation probability value is lower than ½, sets the fourth spatial relation probability at the fourth spatial relation probability value when the fourth spatial relation probability value is equal to or higher than ½, sets the fourth spatial relation probability at a value equal to or higher than ½ when the fourth spatial relation probability value is lower than ½, sets the first temporal relation probability at the first temporal relation probability value when the first temporal relation probability value is equal to or higher than ½, sets the first temporal relation probability at a value equal to or higher than ½ when the first temporal relation probability value is lower than ½, sets the fourth temporal relation probability at the fourth temporal relation probability value when the fourth temporal relation probability value is equal to or higher than ½, and sets the fourth temporal relation probability at a value equal to or higher than ½ when the fourth temporal relation probability value is lower than ½.

Further, the object detection apparatus adopts the following configuration: it further includes an occurrence probability acquisition portion; the occurrence probability acquisition portion acquires the occurrence probability of the background for the attentive pixel and the occurrence probability of the foreground for the attentive pixel based on the characteristic quantity of the attentive pixel, and acquires the occurrence probability of the background for the peripheral pixel and the occurrence probability of the foreground for the peripheral pixel based on the characteristic quantity of the peripheral pixel.

In addition, the particular configuration of the object detection apparatus is realized by the object detection apparatus disclosed in each of the exemplary embodiments described hereinbefore. Especially, each of the probabilities is realized as the formulas (1) to (3) and the descriptions related to the formulas in the first exemplary embodiment.

Further, the object detection apparatus can be accomplished by installing a computer program in a computer. In particular, another aspect of the present invention provides a computer program product including computer implementable instructions to make a computer function as: a posterior probability calculation portion utilizing an occurrence probability of a background and a foreground acquired by utilizing a characteristic quantity extracted from each pixel of an input image and a probability density function, a posterior probability of the background and the foreground for the previous input image to the input image, and a conditional probability indicating a relation of an event (background or foreground) to the vicinity of an attentive pixel in a spatial direction and a relation of an event to the vicinity of the attentive pixel in a temporal direction so as to calculate a posterior probability of the background and the foreground from a probability model set up based on a tendency that the same event appears in the vicinity of the attentive pixel in the spatial and temporal directions; and an object determination portion for determining an object from comparison of the posterior probability of the background with that of the foreground.

Further, in the computer program product, the following configuration is adopted: the conditional probability is an occurrence probability of an event of a peripheral pixel in the vicinity of the spatial direction when an event of the attentive pixel (background or foreground) occurs, and an occurrence probability of an event of the present attentive pixel in the vicinity of the temporal direction when an event of the attentive pixel of the previous input image occurs.

Further, still another aspect of the present invention provides an object detection method executed by operating the object detection apparatus described hereinabove. The method includes the steps of: calculating a posterior probability by utilizing an occurrence probability of a background and a foreground acquired by utilizing a characteristic quantity extracted from each pixel of an input image and a probability density function, a posterior probability of the background and the foreground for the previous input image to the input image, and a conditional probability indicating a relation of an event (background or foreground) to the vicinity of an attentive pixel in a spatial direction and a relation of an event to the vicinity of the attentive pixel in a temporal direction so as to calculate the posterior probability of the background and the foreground from a probability model set up based on a tendency that the same event appears in the vicinity of the attentive pixel in the spatial and temporal directions; and determining an object from comparison of the posterior probability of the background with that of the foreground.

Further, in the object detection method, the following configuration is adopted: the conditional probability is an occurrence probability of an event of a peripheral pixel in the vicinity of the spatial direction when an event of the attentive pixel (background or foreground) occurs, and an occurrence probability of an event of the present attentive pixel in the vicinity of the temporal direction when an event of the attentive pixel of the previous input image occurs.

Further, in the object detection method, the following configuration is adopted: in the vicinity of the spatial direction, the conditional probability is set higher in the case that the event of the attentive pixel is the same as the event of the peripheral pixel than in the case that they are different; and in the vicinity of the temporal direction, the conditional probability is set higher in the case that the event of the attentive pixel of the previous input image is the same as the event of the present attentive pixel than in the case that they are different.

Further, in the object detection method, the following configuration is adopted: from a result by the determining, the conditional probability sequentially counts a number with respect to totally four cases that the peripheral pixel is determined as the background or the foreground when the attentive pixel is determined as the background or the foreground, and other totally four cases that the present attentive pixel is determined as the background or the foreground when the attentive pixel of the previous input image is determined as the background or the foreground, and utilizes the number to self-update.

Further, in the object detection method, the following configuration is adopted: the conditional probability should neither be lower than ½ when the event of the attentive pixel is the same as the event of the peripheral pixel in the vicinity of the spatial direction nor be lower than ½ when the event of the attentive pixel of the previous input image is the same as the event of the present attentive pixel in the vicinity of the temporal direction.

Further, in the object detection method, the following configuration is adopted: the probability density function of the background in the probability density functions observes a result by the determining in a time-series manner, and is estimated from the characteristic quantity sequentially accumulated as the background has changed in trend if an appearance frequency of the foreground is high, while from the characteristic quantity accumulated when the determination result is determined as the background by determining as the background has not changed in trend if the appearance frequency of the foreground is low.

Further, in the object detection method, the following configuration is adopted: the characteristic quantity is a two-dimensional or multidimensional characteristic vector combining a plurality of one-dimensional characteristic quantities.

Further, in the object detection method, the following configuration is adopted: the characteristic quantity is a characteristic quantity and a characteristic vector with a block acquired from a local area set up in the image as a unit.

Further, in the object detection method, the following configuration is adopted: the probability density function of the foreground in the probability density functions is uniformly distributed.

Further, in the object detection method, the following configuration is adopted: the probability density function of the foreground in the probability density functions is a probability density function estimated by analyzing the target object to be detected in advance.

Further, in the object detection method, the following configuration is adopted: in the determining, comparison is made between the posterior probabilities of the background and the foreground acquired in the calculating of the posterior probability to determine the object as the background if the posterior probability of the background is higher and as the foreground if the posterior probability of the foreground is higher.

Inventions of computer program or object detection method having the configuration described hereinabove can achieve the exemplary object of the present invention described hereinbefore for the reason of having the same effect as the subject object detection apparatus.

Hereinabove, the present invention was described with reference to each of the exemplary embodiments. However, the present invention should not be limited to the exemplary embodiments described hereinabove. Those skilled in the art may apply various comprehensible modifications to the configuration and details of the present invention without departing from the spirit and scope of the present invention.

The present application is the National Phase of PCT/JP2009/001584, filed Apr. 6, 2009, which claims priority from Japanese Patent Application No. 2008-101097, filed on Apr. 9, 2008, the disclosure of which is incorporated herein by reference in its entirety.

The invention claimed is:

1. An object detection apparatus comprising:
a posterior probability calculation portion utilizing an occurrence probability of a background and a foreground acquired by utilizing a characteristic quantity extracted from each pixel of an input image and a probability density function, a posterior probability of the background and the foreground for the previous input image to the input image, and a conditional probability indicating a relation of an event (background or foreground) to the vicinity of an attentive pixel in a spatial direction and a relation of an event to the vicinity of the attentive pixel in a temporal direction so as to calculate a posterior probability of the background and the foreground from a probability model set up based on a tendency that the same event appears in the vicinity of the attentive pixel in the spatial and temporal directions; and
an object determination portion for determining an object from comparison of the posterior probability of the background with that of the foreground.

2. The object detection apparatus according to claim 1, wherein the conditional probability is an occurrence probability of an event of a peripheral pixel in the vicinity of the spatial direction when an event of the attentive pixel (background or foreground) occurs, and an occurrence probability of an event of the present attentive pixel in the vicinity of the temporal direction when an event of the attentive pixel of the previous input image occurs.

3. The object detection apparatus according to claim 2, wherein in the vicinity of the spatial direction, the conditional probability is set higher in the case that the event of the attentive pixel is the same as the event of the peripheral pixel than in the case that they are different; and in the vicinity of the temporal direction, the conditional probability is set higher in the case that the event of the attentive pixel of the previous input image is the same as the event of the present attentive pixel than in the case that they are different.

4. The object detection apparatus according to claim 2, wherein from a determination result of the object determination portion, the conditional probability sequentially counts a number with respect to totally four cases that the peripheral pixel is determined as the background or the foreground when the attentive pixel is determined as the background or the foreground, and other totally four cases that the present attentive pixel is determined as the background or the foreground when the attentive pixel of the previous input image is determined as the background or the foreground, and utilizes the number to self-update.

5. The object detection apparatus according to claim 4, wherein the conditional probability should neither be lower than ½ when the event of the attentive pixel is the same as the event of the peripheral pixel in the vicinity of the spatial direction nor be lower than ½ when the event of the attentive pixel of the previous input image is the same as the event of the present attentive pixel in the vicinity of the temporal direction.

6. The object detection apparatus according to claim 1, wherein the probability density function of the background in the probability density functions observes a determination result of the object determination portion in a time-series manner, and is estimated from the characteristic quantity sequentially accumulated as the background has changed in trend if an appearance frequency of the foreground is high, while from the characteristic quantity accumulated when the determination result is determined as the background by the object determination portion as the background has not changed in trend if the appearance frequency of the foreground is low.

7. The object detection apparatus according to claim 1, wherein the characteristic quantity is a two-dimensional or multidimensional characteristic vector combining a plurality of one-dimensional characteristic quantities.

8. The object detection apparatus according to claim 1, wherein the characteristic quantity is a characteristic quantity and a characteristic vector with a block acquired from a local area set up in the image as a unit.

9. The object detection apparatus according to claim 1, wherein the probability density function of the foreground in the probability density functions is uniformly distributed.

10. The object detection apparatus according to claim 1, wherein the probability density function of the foreground in the probability density functions is a probability density function estimated by analyzing the target object to be detected in advance.

11. The object detection apparatus according to claim 1, wherein the object determination portion compares the posterior probabilities of the background and the foreground acquired by the posterior probability calculation portion to determine the object as the background if the posterior probability of the background is higher and as the foreground if the posterior probability of the foreground is higher.

12. An object detection apparatus comprising:
a posterior probability calculation portion for calculating a posterior probability of a foreground for an attentive pixel and a posterior probability of a background for the attentive pixel as the posterior probability of the foreground and the posterior probability of the background for the attentive pixel of a present image included in a moving image; and
an object determination portion for determining an object based on comparison of the posterior probability of the foreground for the attentive pixel with the posterior probability of the background for the attentive pixel,
the posterior probability calculation portion calculating the posterior probability of the background for the attentive pixel based on:
an occurrence probability of the background for the attentive pixel as the occurrence probability of the background of the attentive pixel;
an occurrence probability of the background for a peripheral pixel as the occurrence probability of the background of the peripheral pixel which is a pixel of the present image and located in the vicinity of the attentive pixel;
a first spatial relation probability indicating a probability that the peripheral pixel becomes the background when the attentive pixel is the background;
an occurrence probability of the foreground for the peripheral pixel as the occurrence probability of the foreground of the peripheral pixel;
a second spatial relation probability indicating a probability that the peripheral pixel becomes the foreground when the attentive pixel is the background;
a posterior probability of the background for a past pixel as the posterior probability of the background of the past pixel which is a pixel of a past image included in the moving image and corresponds to the attentive pixel;
a first temporal relation probability indicating a probability that the attentive pixel becomes the background when the past pixel is the background;
a posterior probability of the foreground for the past pixel as the posterior probability of the foreground of the past pixel; and
a second temporal relation probability indicating a probability that the attentive pixel becomes the background when the past pixel is the foreground,
the posterior probability calculation portion calculating the posterior probability of the foreground for the attentive pixel based on:
an occurrence probability of the foreground for the attentive pixel as the occurrence probability of the foreground of the attentive pixel;
the occurrence probability of the background for the peripheral pixel;
a third spatial relation probability indicating a probability that the peripheral pixel becomes the background when the attentive pixel is the foreground;
the occurrence probability of the foreground for the peripheral pixel;
a fourth spatial relation probability indicating a probability that the peripheral pixel becomes the foreground when the attentive pixel is the foreground;
the posterior probability of the background for the past pixel;
a third temporal relation probability indicating a probability that the attentive pixel becomes the foreground when the past pixel is the background;
the posterior probability of the foreground for the past pixel; and
a fourth temporal relation probability indicating a probability that the attentive pixel becomes the foreground when the past pixel is the foreground,
the first spatial relation probability being higher than the second spatial relation probability;
the fourth spatial relation probability being higher than the third spatial relation probability;
the first temporal relation probability being higher than the third temporal relation probability; and
the fourth temporal relation probability being higher than the second temporal relation probability.

13. The object detection apparatus according to claim 12 further comprising a relation probability calculation portion,
wherein the sum of the first spatial relation probability and the second spatial relation probability is 1, the sum of the fourth spatial relation probability and the third spatial relation probability is 1, the sum of the first temporal relation probability and the third temporal relation probability is 1, and the sum of the fourth temporal relation probability and the second temporal relation probability is 1; and
wherein the relation probability calculation portion calculates a first spatial relation probability value, a fourth spatial relation probability value, a first temporal relation probability value, and a fourth temporal relation probability value; sets the first spatial relation probability at the first spatial relation probability value when the first spatial relation probability value is equal to or higher than ½, sets the first spatial relation probability at a value equal to or higher than ½ when the first spatial relation probability value is lower than ½, sets the fourth spatial relation probability at the fourth spatial relation probability value when the fourth spatial relation probability value is equal to or higher than ½, sets the fourth spatial relation probability at a value equal to or higher than ½ when the fourth spatial relation probability value is lower than ½, sets the first temporal relation probability at the first temporal relation probability value when the first temporal relation probability value is equal to or higher than ½, sets the first temporal relation probability at a value equal to or higher than ½ when the first temporal relation probability value is lower than ½, sets the fourth temporal relation probability at the fourth temporal relation probability value when the fourth temporal relation probability value is equal to or higher than ½, and sets the fourth temporal relation probability at a value equal to or higher than ½ when the fourth temporal relation probability value is lower than ½.

14. The object detection apparatus according to claim 12 further comprising an occurrence probability acquisition portion, wherein the occurrence probability acquisition portion acquires the occurrence probability of the background for the attentive pixel and the occurrence probability of the foreground for the attentive pixel based on the characteristic quantity of the attentive pixel, and acquires the occurrence probability of the background for the peripheral pixel and the occurrence probability of the foreground for the peripheral pixel based on the characteristic quantity of the peripheral pixel.

15. A computer program product comprising a non-transitory computer readable medium encoded with computer implementable instructions to make a computer function as:
a posterior probability calculation portion utilizing an occurrence probability of a background and a foreground acquired by utilizing a characteristic quantity extracted from each pixel of an input image and a probability density function, a posterior probability of the background and the foreground for the previous input image to the input image, and a conditional probability indicating a relation of an event (background or foreground) to the vicinity of an attentive pixel in a spatial direction and a relation of an event to the vicinity of the attentive pixel in a temporal direction so as to calculate a posterior probability of the background and the foreground from a probability model set up based on a tendency that the same event appears in the vicinity of the attentive pixel in the spatial and temporal directions; and
an object determination portion for determining an object from comparison of the posterior probability of the background with that of the foreground.

16. The computer program product comprising a non-transitory computer readable medium encoded with computer implementable instructions according to claim 15, wherein the conditional probability is an occurrence probability of an event of a peripheral pixel in the vicinity of the spatial direction when an event of the attentive pixel (background or foreground) occurs, and an occurrence probability of an event of the present attentive pixel in the vicinity of the temporal direction when an event of the attentive pixel of the previous input image occurs.

17. An object detection method comprising the steps of:
calculating a posterior probability by utilizing an occurrence probability of a background and a foreground acquired by utilizing a characteristic quantity extracted from each pixel of an input image and a probability density function, a posterior probability of the background and the foreground for the previous input image to the input image, and a conditional probability indicating a relation of an event (background or foreground) to the vicinity of an attentive pixel in a spatial direction and a relation of an event to the vicinity of the attentive pixel in a temporal direction so as to calculate the posterior probability of the background and the foreground from a probability model set up based on a tendency that the same event appears in the vicinity of the attentive pixel in the spatial and temporal directions; and
determining an object from comparison of the posterior probability of the background with that of the foreground.

18. The object detection method according to claim 17, wherein the conditional probability is an occurrence probability of an event of a peripheral pixel in the vicinity of the spatial direction when an event of the attentive pixel (background or foreground) occurs, and an occurrence probability of an event of the present attentive pixel in the vicinity of the temporal direction when an event of the attentive pixel of the previous input image occurs.

19. The object detection method according to claim 18, wherein in the vicinity of the spatial direction, the conditional probability is set higher in the case that the event of the attentive pixel is the same as the event of the peripheral pixel than in the case that they are different; and in the vicinity of the temporal direction, the conditional probability is set higher in the case that the event of the attentive pixel of the previous input image is the same as the event of the present attentive pixel than in the case that they are different.

20. The object detection method according to claim 18, wherein from a result by the determining, the conditional probability sequentially counts a number with respect to totally four cases that the peripheral pixel is determined as the background or the foreground when the attentive pixel is determined as the background or the foreground, and other totally four cases that the present attentive pixel is determined as the background or the foreground when the attentive pixel of the previous input image is determined as the background or the foreground, and utilizes the number to self-update.

21. The object detection method according to claim 20, wherein the conditional probability should neither be lower than ½ when the event of the attentive pixel is the same as the event of the peripheral pixel in the vicinity of the spatial direction nor be lower than ½ when the event of the attentive pixel of the previous input image is the same as the event of the present attentive pixel in the vicinity of the temporal direction.

22. The object detection method according to claim 17, wherein the probability density function of the background in the probability density functions observes a result by the determining in a time-series manner, and is estimated from the characteristic quantity sequentially accumulated as the background has changed in trend if an appearance frequency of the foreground is high, while from the characteristic quantity accumulated when the determination result is determined as the background by determining as the background has not changed in trend if the appearance frequency of the foreground is low.

23. The object detection method according to claim 17, wherein the characteristic quantity is a two-dimensional or multidimensional characteristic vector combining a plurality of one-dimensional characteristic quantities.

24. The object detection method according to claim 17, wherein the characteristic quantity is a characteristic quantity and a characteristic vector with a block acquired from a local area set up in the image as a unit.

25. The object detection method according to claim 17, wherein the probability density function of the foreground in the probability density functions is uniformly distributed.

26. The object detection method according to claim 17, wherein the probability density function of the foreground in the probability density functions is a probability density function estimated by analyzing the target object to be detected in advance.

27. The object detection method according to claim 17, wherein in the determining, comparison is made between the posterior probabilities of the background and the foreground acquired in the calculating of the posterior probability to determine the object as the background if the posterior probability of the background is higher and as the foreground if the posterior probability of the foreground is higher.

28. An object detection apparatus comprising:
a posterior probability calculation means for utilizing an occurrence probability of a background and a foreground acquired by utilizing a characteristic quantity extracted from each pixel of an input image and a probability density function, a posterior probability of the background and the foreground for the previous input image to the input image, and a conditional probability indicating a relation of an event (background or foreground) to the vicinity of an attentive pixel in a spatial direction and a relation of an event to the vicinity of the attentive pixel in a temporal direction so as to calculate a posterior probability of the background and the foreground from a probability model set up based on a tendency that the same event appears in the vicinity of the attentive pixel in the spatial and temporal directions; and
an object determination means for determining an object from comparison of the posterior probability of the background with that of the foreground.

* * * * *